United States Patent [19]  
Jameson et al.

[11] 4,180,480  
[45] Dec. 25, 1979

[54] CATALYTICALLY ACTIVE COMPOSITIONS FROM PRECIOUS METAL COMPLEXES

[75] Inventors: Melvin N. Jameson, St. Marys; Gerald A. Krulik, Washington, both of W. Va.

[73] Assignee: McGean Chemical Company, Inc., Cleveland, Ohio

[21] Appl. No.: 971,683

[22] Filed: Dec. 21, 1978

Related U.S. Application Data

[63] Continuation-in-part of Ser. No. 622,789, Oct. 15, 1975, abandoned.

[51] Int. Cl.² ........................ B01J 31/02; C09D 5/00
[52] U.S. Cl. ............................ 252/429 R; 106/1.05; 106/1.11
[58] Field of Search ............... 252/429 R; 106/1.05, 106/1.11

[56] References Cited

U.S. PATENT DOCUMENTS

| | | | |
|---|---|---|---|
| 3,011,920 | 12/1961 | Shipley, Jr. | 252/472 |
| 3,274,022 | 9/1966 | Rhoda | 106/1 X |
| 3,627,558 | 12/1971 | Roger et al. | 106/1 X |
| 3,632,388 | 1/1972 | Grunwald | 106/1 X |
| 3,874,897 | 4/1975 | Fadgen et al. | 106/1 X |
| 3,904,792 | 9/1975 | Gulla et al. | 106/1 X |

Primary Examiner—Delbert E. Gantz  
Assistant Examiner—William G. Wright  
Attorney, Agent, or Firm—Fay & Sharpe

[57] ABSTRACT

An electroless plating catalyst prepared by reacting a tin salt in the molten state with a precious metal complex. The final catalyst may be a solid or a liquid at room temperature, depending upon the reaction conditions, and it can be reconstituted by dilution with an appropriate aqueous solution to prepare or replenish catalytic working baths for electroless plating. Examples include the molten salt reaction of precious metal complexes with anhydrous stannous chloride or stannous chloride dihydrate.

24 Claims, No Drawings

CATALYTICALLY ACTIVE COMPOSITIONS FROM PRECIOUS METAL COMPLEXES

CROSS REFERENCE TO RELATED APPLICATIONS

This application is a continuation-in-part of our application Ser. No. 622,789 filed Oct. 15, 1975 now abandoned.

The subject matter of this invention is also related to three earlier filed applications: (1) U.S. patent application Ser. No. 574,498 filed May 5, 1975 by M. N. Jameson and G. A. Krulik; (2) U.S. application Ser. No. 591,363 filed June 30, 1975 now abandoned by M. N. Jameson and G. A. Krulik, now abandoned in favor of continuation application Ser. No. 748,331 filed Dec. 7, 1976 now abandoned; and (3) U.S. application Ser. No. 652,002 filed Jan. 26, 1976 now abandoned. The first application deals with the broad concept of preparing catalytically active compositions by means of molten salt reactions; the second case is directed to an improvement in which aqueous compositions are prepared by using metal halide salts instead of acid; and the third case is an improvement on application (1), identified above, using specific combinations of certain stannous halide salts.

BACKGROUND OF THE INVENTION

1. Field of the Invention

Catalytically active compositions for use in plating metal on a nonconductive substrate.

2. Description of the Prior Art

U.S. Pat. No. 3,011,920 (Shipley) describes a process in which a colloidal solution is prepared by mixing an aqueous acid solution of palladium chloride with an aqueous acid solution of stannous chloride and optionally including a tin salt such as sodium stannate. This is purported to produce a lyophilic colloid which, after acceleration with an acid or alkaline solution such as hydrochloric acid or sodium hydroxide, provides a sensitizing layer for the subsequent electroless plating of a metal such as copper.

U.S. Pat. No. 3,672,923 (Zeblisky) describes solid compositions dilutable to optically clear sensitizing solutions for electroless plating. These solutions are prepared by combining a dilute solution of a noble metal salt in hydrochloric acid with a hydrochloric acid solution of a stannous salt such as stannous chloride dihydrate. The mixture is heated and then subsequently cooled and evaporated to dryness under vacuum to constant weight. The solid composition, as described, may then be reconstituted in hydrochloric acid to provide an active sensitizing solution.

U.S. Pat. No. 3,904,792 (Gulla et al) describes a catalyst containing an acid soluble salt of a catalytic metal, a stannous salt, an acid and an extraneous source of halide ions.

U.S. Pat. No. 3,627,558 (Roger et al) describes the use of chelating agents such as disodium EDTA for pretreatment of the substrate where metal oxides may be present.

U.S. Pat. No. 3,874,897 (Fadgen et al) describes a Lewis base modified palladium-tin catalyst.

U.S. Pat. No. 3,274,022 (Rhoda) describes the use of EDTA as a stabilizer for palladium containing catalysts. This reference, however, does not relate to palladium tin catalysts of the type to which the present invention is concerned.

SUMMARY OF THE INVENTION

The present invention relates to catalytically active compositions for rendering the surface of a nonconductive substrate receptive to an electroless plating solution to form a uniformly adherent layer of metal. This layer, sometimes referred to as the preplate, may then be electrolytically plated in any conventional manner. It is well understood in the art that the sensitizing step, described above, is preceeded by a surface treatment which renders the substrate surface capable of forming a tight bond. This is normally done by etching in a strong oxidizing acid solution such as chromic acid, or a mixture of chromic and sulfuric acids.

As described above in connection with the discussion of the prior art, the solutions heretofore recognized as being effective for catalytic sensitization of the surface are so-called palladium-tin systems in which a palladium salt, such as palladium chloride, and a tin salt such as stannous chloride, are prepared by carefully mixing solutions (in aqueous hydrochloric acid) to form a solution which may or may not be colloidal in nature. It should be noted that whereas the Shipley patent purports to describe a colloidal system, the Zeblisky patent describes optically clear solutions which are stated to be noncolloidal in nature. In any event, the solutions in both cases are prepared by a reaction in aqueous acid solution to form the sensitizing composition whether it be a colloid or a complex. Some problems may be experienced in preparing the Zeblisky dry catalyst compositions because of the difficulty in removing all excess water and hydrochloric acid. It is necessary to evaporate the solution to dryness to produce the solid compositions therein described, and the catalytic activity and stability can be seriously affected if water and/or large amounts of acid remains after evaporation.

It would, of course, be desirable to provide compositions in highly concentrated form because of their ease in handling. This is especially true when considering the difficulty of replenishing an existing working bath. If the replenisher solution is added in relatively dilute liquid form, it is normal practice to remove an equivalent volume of the exhausted bath to make room for the addition. If the materials can be added in solid or concentrated liquid form, it is only necessary to calculate the amount of composition needed to bring the bath up to working strength and then add the catalyst. Moreover, it is obvious that shipping and storage of a dry material (or liquid concentrate) would be more economical; and the fact that the typical HCl solutions are not involved reduces the safety hazards in handling the catalyst.

There are some practical limitations on how concentrated one can make known catalyst solutions without running into crystallization and stability problems. The maximum concentration normal in commercial use is about four pounds of stannous chloride and 20 gms. of palladium chloride per gallon of solution. A solid or concentrated liquid catalyst, of the type described herein, can be made substantially of only stannous chloride and the catalytic palladium chloride - stannous chloride reaction product, leading to much more concentrated and stable compositions.

The compositions herein described are prepared by reacting a molten tin halide component, such as stannous chloride and/or stannous chloride dihydrate (with or without stannic chloride or its hydrates), with a noble metal salt. In order to stabilize the catalytic component, the present invention proposes to react a tin salt in the molten state with a precious metal complex which includes an appropriate complexing agent or chelate capable of interacting with the precious metal used.

A source of extra halide anion must be present and may be derived from the chloride or bromide salts of water soluble alkali metal halides, water soluble alkaline earth metal halides, water soluble rare earth metal halides and certain transition metal halides having a compatible oxidation state which will neither reduce or oxidize the stannous chloride. In addition, ammonium chloride and bromide, or any water soluble substituted ammonium chloride or bromide, such as tetramethyl ammonium chloride or bromide, may be employed. As to water solubility, all of the aforementioned compositions should be water soluble at room temperature to the extent of about 0.1 moles per liter for practical utility.

DETAILED DESCRIPTION OF THE INVENTION

In order to best understand the principles of the present invention, the following examples are provided for illustrative purposes only.

EXAMPLE I

A stock solution of a palladium double salt, potassium chloropalladite ($K_2PdCl_4$), in excess KCl solution, referred to herein as the "double salt mixture," was prepared by mixing 6.00 gms. of $PdCl_2$ in 25 mls. of water and adding sufficient KCl until the $PdCl_2$ dissolved. This required 6.51 gms. of KCl. The solution was diluted to 100 mls. volumetrically. To 8.3 mls. of the double salt mixture, 2.10 gms. of disodium ethylenediaminetetracetic acid (EDTA) were added based on a desired molar ratio of about 2:1 for complexer to palladium (II). After addition of the complexer, water was added to a volume of 20 mls. and the mixture was stirred 30 minutes. The mixture was then evaporated to dryness. Forty gms. of molten $SnCl_2.2H_2O$ were added to the dried composition and the mixture was reacted at 95° C. for 20 minutes. An 18.1 gm. sample was dissolved in 243 mls. of reagent HCl (37%) and 750 mls. of $H_2O$ to prepare a catalyst solution for plating an ABS resin (Borg-Warner Chemicals EP-3510).

Standard test plaques were sequenced through a preplate cycle which included the following steps: (1) etching of the plaque in a chromic-sulfuric acid bath; (2) rinsing in water; (3) neutralizing any remaining acid upon the surface; (4) sensitizing in the catalytic solution as described above; (5) acceleration of the sensitizer; and (6) immersion in an electroless nickel bath. A more detailed description of the preferred concentrations and immersion times is found in "Preplate Systems" by John Robertson, Products Finishing, Vol. 37, No. 4 (January 1973).

Coverage of the electroless nickel over the surface of the plaques was good to excellent depending upon the preplate procedure.

EXAMPLE II

To 8.3 mls. of the double salt mixture stock solution, 0.42 gms. of glycine were added based on a molar ratio of 2:1 for complexer to palladium (II). After addition of the complexer, water was added to a volume of 20 mls., stirred until dissolved, and evaporated to dryness. Forty gms. of molten $SnCl_2.2H_2O$ were added and reacted at 95° C. for 20 minutes. A sample weighing 17.3 gms. was dissolved in 243 mls. of reagent HCl and 750 mls. of $H_2O$ to prepare a catalyst working bath. Coverage on ABS plaques processed through this catalyst working bath was good to excellent depending upon the preplate procedure.

EXAMPLE III

To 8.3 mls. of the double salt mixture stock solution, 1.23 gms. of sodium gluconate were added based on a molar ratio of 2:1 for complexer to palladium (II). After addition of the complexer; water was added to a volume of 20 mls., stirred until dissolved, and evaporated to dryness. Forty gms. of molten $SnCl_2.2H_2O$ were added and reacted at 95° C. for 20 minutes. Twenty gms. were dissolve in 243 mls. of reagent HCl and 750 mls. of $H_2O$ to prepare a catalyst bath. Coverage results on ABS plaques were excellent.

EXAMPLE IV

The two-step addition of $SnCl_2.2H_2O$ to a noble metal complex was extremely effective for increasing catalytic activity. One gm. of $PdCl_2$ and 3.36 gms. of KCl were dissolved in approximately 15 mls. of $H_2O$. A solution containing 4.20 gms. of disodium EDTA was added to the double salt mixture, stirred, and evaporated to dryness. To this dried metal complex salt, 12.73 gms. of $SnCl_2.2H_2O$ were added and reacted 15 minutes at 95° C. Then 58.67 gms. of $SnCl_2.2H_2O$ were added and reacted another 15 minutes at 95° C. Nine gms. of the resultant product were dissolved in 121 mls. of reagent HCl and 375 mls. of $H_2O$ to provide a catalyst working bath. Electroless coverage of ABS plaques processed through this catalyst solution was excellent.

EXAMPLE V

The presence of the KCl or other halide salt in combination with the noble metal complex in the molten salt reaction is very significant as can be demonstrated by the following experiment. One gm. of $PdCl_2$ was dissolved in approximately 10 mls. of reagent $NH_4OH$. A solution of 4.20 gms. of disodium EDTA in 10 mls. of $NH_4OH$ was added to the palladium salt solution. The solution of Pd-EDTA complex was evaporated to dryness. To the dried salt, 12.73 gms. of $SnCl_2.2H_2O$ were added and reacted at 95° C. for 15 minutes. Then 58.67 gms. of $SnCl_2.2H_2O$ were added and reacted another 15 minutes at 95° C. Nine gms. of this material were dissolved in 500 mls of 3 N HCl to produce a working bath. This working bath was not catalytic for electroless plating.

EXAMPLE VI

A mixture of 2 gms. KCl, 2.1 gms. $Na_2$ EDTA and 0.5 gms. $PdCl_2$ were dissolved in the minimum amount of water necessary and then evaporated to dryness. The dried composition was added to 6.35 gms. $SnCl_2.2H_2O$ and the mixture was reacted at 95° C. for five minutes. An additional 29.3 gms. of $SnCl_2.H_2O$ was added and the reaction continued for an additional 15 minutes at 95° C. The mixture was cooled and 9 gms. of the resulting composition was dissolved in 500 ml. of 3 N HCl to prepare a solution of working bath strength for plating on standard plaques of ABS (Borg-Warner EP-3510).

Plating was excellent after five minutes immersion. The ratio of stannous ion to palladium ion (Sn/Pd) was 56:1.

EXAMPLE VII

A mixture of 2.88 gms. NaBr, 2.1 gms. $Na_2$ EDTA, and 0.5 gms. $PdCl_2$ was reacted as in Example VI. To the dry product was added 12 gms. $SnCl_2.2H_2O$ at 80° C. for 15 minutes, followed by an additional 30 gms. $SnCl_2.2H_2O$ for 15 minutes more. A sample of 10 gms. was dissolved in 100 ml. 3 N HCl. Plating was excellent after five minutes immersion. Sn/Pd=66/1.

EXAMPLE VIII

A mixture of 1.02 gms. $MgCl_2.6H_2O$, 0.5 gm. $PdCl_2$, and 2.1 gms. $Na_2$ EDTA was reacted as above. To the dry product was added 40 gms. $SnCl_2.2H_2O$ at 80° C. for 20 minutes. A sample of 5 gms. was dissolved in 100 ml. 3 N HCl. Plating was excellent after five minutes immersion. Sn/Pd=63/1.

EXAMPLE IX

A mixture of 0.54 gm. $NH_4Cl$, 0.5 gm. $PdCl_2$, and 2.1 gms. $Na_2$ EDTA was reacted as above. To the dry product was added 40 gms. $SnCl_2.2H_2O$ and it was reacted at 80° C. for 20 minutes. A sample of 5 gms. was dissolved in 100 cc. 3 N HCl. Plating was excellent after five minutes immersion. Sn/Pd=63/1.

EXAMPLE X

A mixture of 1.25 gms. $LaCl_3.7H_2O$, 0.5 gm. $PdCl_2$, and 4.0 gms. $Na_2$ EDTA was reacted as above. To the dry product was added 40 gms. $SnCl_2.2H_2O$ and it was reacted at 80° C. for 20 minutes. A sample of 15 gms. was dissolved in 100 ml 3 N HCl. Plating was good after ten minutes immersion. Sn/Pd=63/1.

EXAMPLE XI

A mixture of 1.0 gm. $MnCl_2.4H_2O$, 0.5 gm. $PdCl_2$, and 4.0 gms. $Na_2$ EDTA was reacted as above. To the dry product was added 40 gms. $SnCl_2.2H_2O$. It was reacted at 80° C. for 20 minutes. All of the product was dissolved in 100 ml 3 N HCl. Plating was fair after 15 minutes immersion. Sn/Pd=63/1.

EXAMPLE XII

A mixture of 0.89 gm. $CrCl_3.6H_2O$, 0.5 gm. $PdCl_2$, and 2.1 gms. $Na_2$ EDTA was reacted as above. To the dry product was added 40 gms. $SnCl_2.2H_2O$. It was reacted at 80° C. for 20 minutes. A sample of 5 gms. was dissolved in 100 ml 3 N HCl. Plating was excellent after five minutes immersion. Sn/Pd=63/1.

EXAMPLE XIII

An 8.3 ml. sample of the double salt mixture (Example I), containing 0.5 gm. $PdCl_2$ as $K_2PdCl_4$ is mixed with 4.25 gm. of tartaric acid based on a 10:1 ratio of complexing agent to palladium. After the tartaric acid is dissolved, the mixture is evaporated to dryness.

The dry palladium tartrate complex is then mixed with 25.3 gm. $SnCl_2.2H_2O[Sn/Pd=40/1]$ and heated at 80° C. for 40 minutes. The reaction product is allowed to cool and solidify. A 15 gm. sample is dissolved in 500 ml. 1 N HCl to prepare a working bath for plating.

EXAMPLE XIV

A palladium - EDTA complex is prepared in accordance with Example I. A sample containing 3.15 gm. of the dry complex is mixed with 40 gm. molten $SnCl_2.2H_2O$ and 9.9 gm. of $SnBr_2$ (anhydrous) and reacted at 95° C. for 30 minutes. The ratio of Sn/Pd=76/1.

In summary, the halide (bromide or chloride) anion may be obtained from a wide variety of compositions including ammonium (Example IX), alkali metals (Examples I to IV, and VII), alkaline earth metals (Example VIII), rare earth metals (Example X) and transition metals having an appropriate, stable oxidation state (Examples XI and XII). The only other condition to be satisfied is that they be reasonably soluble (at least 0.1 moles/liter) in water at about 25° C.

With respect to the source of the precious metal ions, the prior art is replete with equivalents to soluble palladium salts. However, palladium is so superior to all others that little practical utility is to be found for platinum, gold, etc. which are mentioned in the aforementioned Zeblisky patent. Also, virtually all the stannous salt equivalents mentioned in Zeblisky have little value. Stannous chloride and other low melting point stannous compounds, of which there are very few, are the only feasible constituents for the practice of this invention.

The source of the molten stannous salt is either $SnCl_2.H_2O$ (m.p.=37.7° C.) or mixtures of $SnCl_2.2H_2$) and one or more additional stannous salts where the melting point of the mixture is below about 140° C. It is not critical whether the complexed palladium salt is added to the molten tin salt or the two components mixed together and then melted. Likewise, the palladium complex need be evaporated to dryness. The aqueous solution of complexed palladium, with excess halide anion, may be added to a composition containing anhydrous stannous chloride to form the stannous chloride dihydrate.

A variety of complexing agents may be used in preparing the palladium complex. In general, they are described in Kirk-Othmer Encyclopedia of Chemical Technology, Second Edition (Vol. 6, pp. 1-24). For example, useful complexers may include, for example, -hydroxy acids, such as citric, tartaric and gluconic acids and their salts; aminocarboxylic acids, such as glycine, and their salts; and chelating agents such as ethylenediamine, EDTA, N,N,N',N'',N'''-diethylenetriaminepentaacetic acid, N-hydroxyyl-N,N diaminetriacetic acid, and nitrilotriacetic acid.

As noted above, the working bath solutions are prepared by dissolving the concentrate in a suitable acid, such as hydrochloric acid or sulfuric acid. The palladium ion concentration in the working bath is preferably between 0.0001 and 0.02 moles per liter.

While this invention has been described in connection with certain specific examples, it is understood that they are only representative and that the invention should be construed and given a scope as broadly as possible consistent with the applicability of the prior art.

What is claimed:

1. A concentrated, catalytically active composition suitable for initiating electroless deposition of metal consisting essentially of the reaction product of a molten tin salt, said tin salt being selected from the group consisting of stannous chloride dihydrate and mixtures of stannous chloride dihydrate with at least one other compatible stannous salt, the melting point of said mixture being below about 140° C.; and the complex formed by reacting a soluble palladium salt, an effective amount of a halide salt from the group consisting of bromide and chloride salts compatible with said tin and palladium salts to render said composition catalytically active when added to an aqueous working bath, and a metal complexing agent capable of forming a complex with palladium.

2. A composition as defined in claim 1 wherein said tin salt is selected from the group consisting of stannous chloride dihydrate and mixtures of stannous chloride dihydrate and anhydrous stannous chloride melting below about 140° C.

3. A composition as defined in claim 1 wherein said halide is a bromide or chloride selected from the group consisting of water soluble alkali metals, water soluble alkaline earth metals, water soluble rare earth metals, water soluble transition metals compatible with stannous ions, and ammonium salts.

4. A composition as defined in claim 1 wherein said palladium salt is palladium chloride.

5. A composition as defined in claim 1 wherein said complexing agent is a negative or positive ion or polar molecule bound to the palladium by a metal-ligand bond.

6. A composition as defined in claim 5 wherein said complexing agent is a chelating agent.

7. A composition as defined in claim 6 wherein said chelating agent is EDTA or salts thereof.

8. A composition as defined in claim 5 wherein said complexing agent is glycine or salts thereof.

9. A composition as defined in claim 5 wherein said complexing agent is gluconic acid or salts thereof.

10. A composition as defined in claim 5 wherein said complexing agent is tartaric acid or salts thereof.

11. A composition as defined in claim 5 wherein the molar ratio of palladium to complexing agent is between 1:1 and 1:10.

12. A method of preparing a concentrated, catalytically active composition suitable for initiating electroless deposition of metal comprising the steps of: (1) preparing a palladium complex by reacting a soluble palladium salt, a compatible chloride or bromide salt and a metal complexing agent; (2) heating a tin salt above the melting point thereof, said tin salt being selected from the group consisting of stannous chloride dihydrate and mixtures of stannous chloride dihydrate with at least one other compatible stannous salt, the melting point of said mixture being below about 140° C.; (3) reacting said palladium complex with said tin salt in the molten state for a sufficient period of time to form a catalytic species; and (4) cooling the reacted mixture to below the melting point of said tin salt.

13. A method as defined in claim 12 wherein said halide is a bromide or chloride selected from the group consisting of water soluble alkali metals, water soluble alkaline earth metals, water soluble rare earth metals, water soluble transition metals compatible with stannous ions, and ammonium salts.

14. A method as defined in claim 12 wherein said palladium salt is palladium chloride.

15. A method as defined in claim 12 wherein said complexing agent is a negative or positive ion or polar molecule bound to the palladium by a metal-ligand bond.

16. A method as defined in claim 15 wherein said complexing agent is a chelating agent.

17. A method as defined in claim 16 wherein said chelating agent is EDTA or salts thereof.

18. A method as defined in claim 15 wherein said complexing agent is glycine or salts thereof.

19. A method as defined in claim 15 wherein said complexing agent is gluconic acid or salts thereof.

20. A method as defined in claim 15 wherein said complexing agent is tartaric acid or salts thereof.

21. A composition as defined in claim 15 wherein the molar ratio of palladium to complexing agent is between 1:1 and 1:10.

22. A catalytically active composition of working bath concentration suitable for initiating electroless deposition of metal consisting essentially of the concentrated composition of claim 1 diluted with a compatible acid selected from the group of hydrochloric acid and sulfuric acid.

23. The composition as defined in claim 22 wherein the palladium ion concentration is 0.0001 to 0.02 moles per liter.

24. The composition as defined in claim 1 wherein the ratio of stannous to palladium is between 2.5:1 and 200:1.

* * * * *